May 10, 1949. M. S. JOHNSON ET AL 2,469,504
BRAKE BEAM SUPPORTING MEANS FOR RAILROAD CARS
Filed June 14, 1948 3 Sheets-Sheet 3
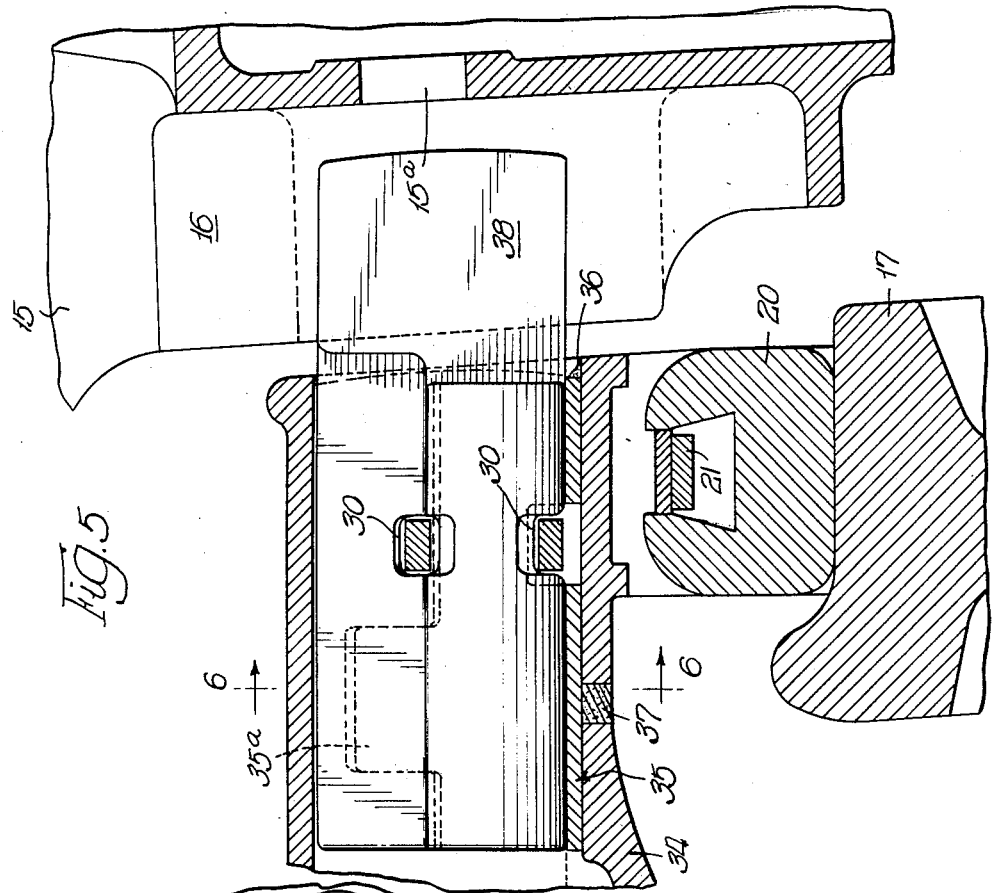
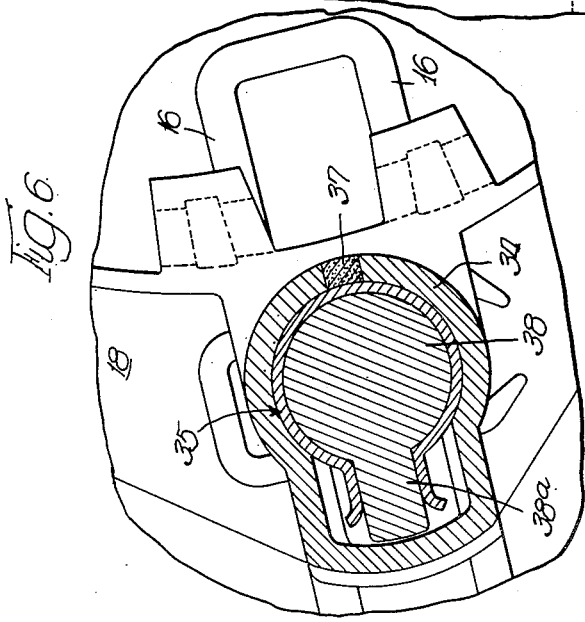
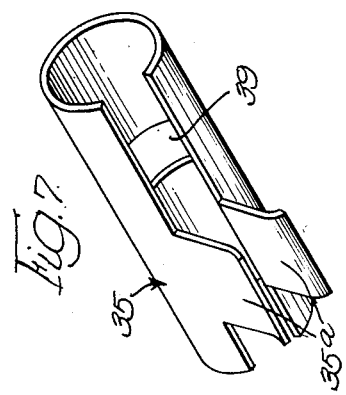
INVENTORS
Malcolm S. Johnson,
By Gilbert F. Oakley,
Atty.

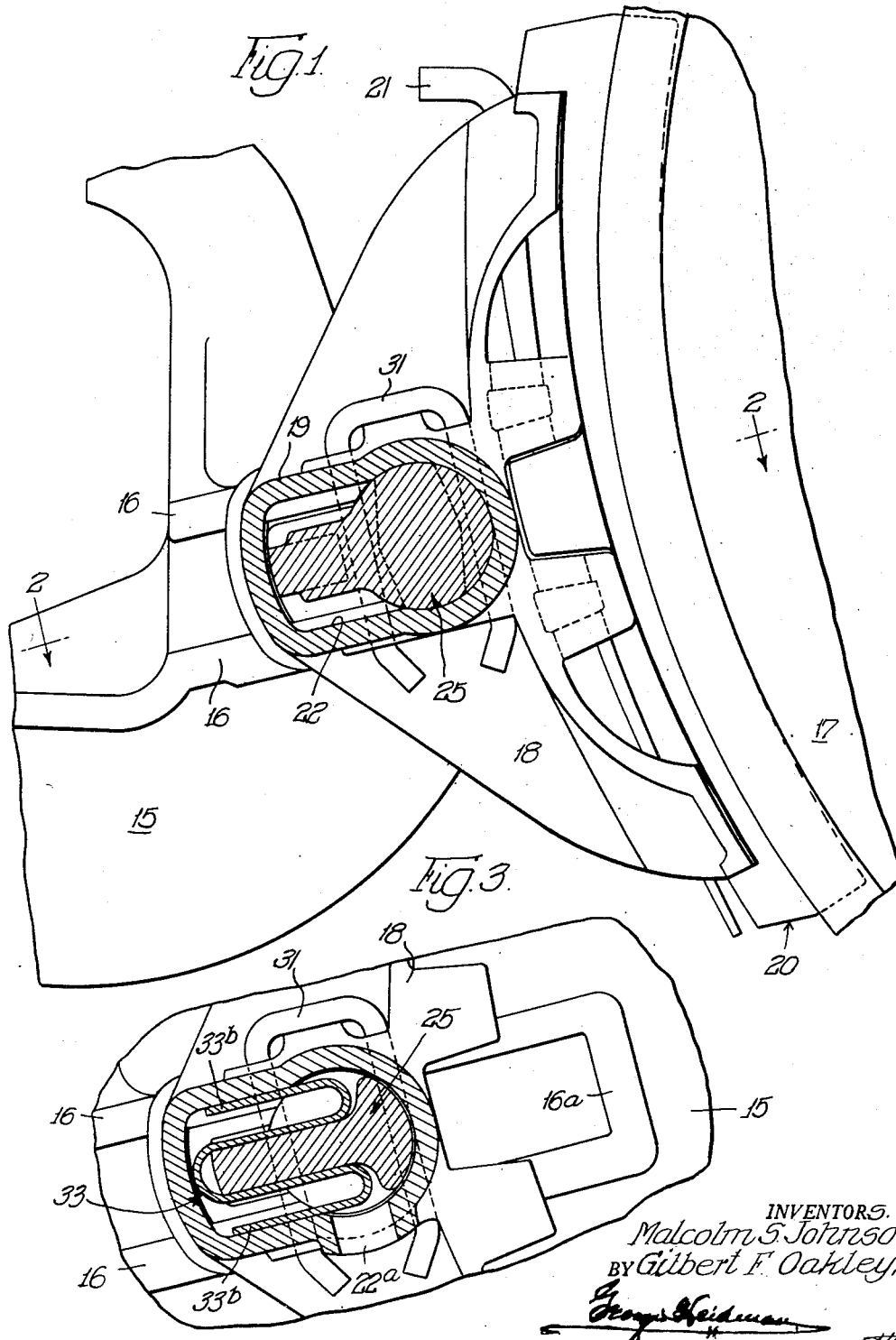

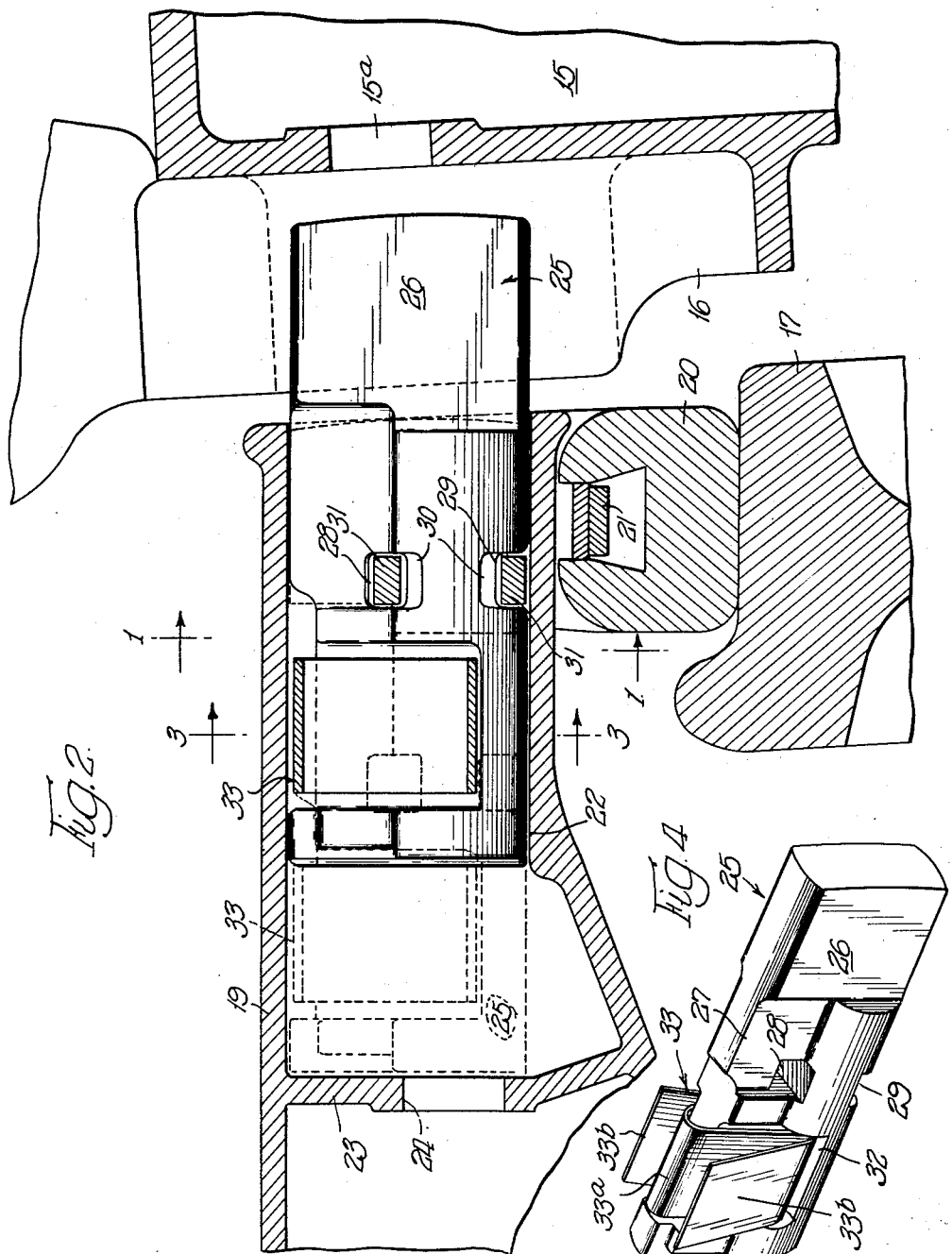

Patented May 10, 1949

2,469,504

UNITED STATES PATENT OFFICE 2,469,504

BRAKE BEAM SUPPORTING MEANS FOR RAILROAD CARS

Malcolm S. Johnson and Gilbert F. Oakley, Chicago, Ill., assignors to Illinois Railway Equipment Company, Chicago, Ill., a corporation of Illinois Application June 14, 1948, Serial No. 32,793

12 Claims. (Cl. 188—212)

Our invention, more particularly stated, relates to guide supported railroad car brake beams which are supported and guided by suitable guideways formed on the inner sides of the truck side frames; our invention more especially pertaining to a brake beam construction which enables easy installation and removal of the brake beam to be made without necessitating dismantling of portions of the truck frame and other elements suspended or secured adjacent the truck side frames; a construction which provides a nominal clearance between the ends of the brake beam and the fixed guides when in inoperative condition.

The invention has for its object the provision of a brake beam with retractable end extensions which are securely held or locked in extended operative position and adapted at the same time to compensate for the tangential loads or forces resulting during the frictional engagement of the brake shoes with the wheels during brake application when the car is in motion.

A further object of the invention is the provision of a brake beam structure which will permit the beam to rotate to a position substantially in line with the forces present and in keeping with the brake shoe contour and thereby eliminate excessive beam stresses, prevent binding in the guide-ways and the resultant drop in braking efficiency; our improved structure being so designed that the vertical loads at the ends of the beam (in either direction) will be uniformly distributed along the full width of the beam extensions instead of being delivered as concentrated loads at diagonally opposite corners; the beam being under the influence of resilient means whereby the beam is maintained at the proper angle in release position.

The objects and advantages of our invention will all be fully comprehended from the following detailed description of the accompanying drawings wherein:

Figure 1 is a side elevation of a portion of a railroad car truck side frame with a slide-way, a brake head and brake shoe and segmental portion of a car wheel, showing a cross-section of our improved brake beam extension.

Figure 2 is a sectional view taken substantially on the line 2—2 of Figure 1, as viewed by the arrows.

Figure 3 is a cross sectional view taken along the line 3—3 of Figure 2.

Figure 4 is a perspective view of the brake beam extension and one form of beam controlling means.

Figure 5 is a view substantially similar to Figure 2 with a modification of the beam extension and extension controlling means.

Figure 6 is a cross-section taken on the line 6—6 of Figure 5 viewed in the direction of the arrows.

Figure 7 is a perspective view of the modified form of beam controlling means.

Our invention pertains to what is known as guide supported brake beam assembly adapted to take the place of the usual brake beam suspension method or link hangers and has for its object the provision of a structure which will permit application and removal of the brake beam to an assembled truck without necessitating the time, labor and expense involved in the removal of the truck from the car and dismantling of the truck side frames to enable replacement of the beam.

In the particular exemplification of the invention disclosed in the first four figures of the drawings, a portion of the inner or wheel side of a truck side frame is shown at 15, which is provided with a pair of vertically spaced and parallel ribs 16, 16 arranged at a predetermined inclination to the center line of the wheel, a portion of which is shown at 17, and the outer or upper ends of the ribs preferably united as at 16a, to provide a guide-way closed at the upper end and open at the lower end adjacent the window or truck bolster receiving opening in the side frame.

It will be understood, of course, that the side frame at the opposite side of the truck (not shown) is of similar construction to provide a guide-way for the other end of the brake beam and hence description of one side will suffice.

In the guide supported brake beams the brake head, shown at 18, is rigidly secured to or cast integral with the brake beam 19 while the brake shoe 20 is removably secured to the brake head by the usual key 21.

The main body portion of the brake beam terminates substantially at the outer side face of the brake head and therefore short of the guide-way portion of the side frame, as shown in Figure 2.

The ends of the brake beam 19, namely at the enlarged juncture between the compression and tension members of the brake beam, are each provided with a longitudinally disposed channel 22, of somewhat keyhole formation at the outer ends and of predetermined length. The bottom of channel 22, preferably has a drain hole 22a, Figure 3. The channel 22 preferably is closed at its inner end by the transverse web or wall 23 (Figure 2) provided with an opening as at 24 to receive a suitable tool or bar whereby the end extensions of the beam may be forced outwardly through the open end of the channel or chamber 22 after properly positioning the beam. The side frame 15, coincident with the guide-way also is provided with a tool receiving opening 15ᵃ (see Figure 2) for the purpose of forcing the extension 25 into retracted position.

The channel or chamber 22 is adapted to receive an elongated end extension 25 consisting preferably of a sturdy or solid construction and of length substantially equal to the length of the channel or chamber 22 in the body of the beam to enable the entire extension to be retracted into the beam proper during beam installation and removal. The edges of the beam preferably are made somewhat arcuate in keeping with the formation of the forward wall of the chamber or channel 22; and the extension member at its outer or guide-way engaging end is provided with flat guide-way engaging top and bottom surfaces 26, see Figures 2 and 4, of substantial length to afford wide and substantial bearing on the slide or guide-way 16, 16, without, however, contacting the main wall of the side frame so as not to effect frictional engagement therewith, as shown in Figure 2.

The extension member 25, inwardly of the slideway engaging end 26, and at its forward edge, is slightly reduced at 27 and provided with a transverse opening 28 while the enlarged or rearwardly presented edge is provided with a transverse groove or slot 29 (Figures 2 and 4) aligned with each other and both of which are adapted to be aligned with the holes 30, 30 in the enlarged chambered portion of the brake beam when the extension is in extended or guide-way engaging position shown in full lines in Figure 2. The registered openings are adapted to receive the U-shape locking pin 31 (see Figure 1) to thereby lock or hold the extension in its extended operative position. In order to prevent dislodgement of the locking pin during the vibrations encountered by the brake beam, the ends of the pin after complete insertion may be slightly bent, as shown in Figure 1. It will be, of course, understood that in order to retract the extension when it becomes necessary to remove the brake beam the pin 31 must first be removed to permit the extension to be forced inwardly out of the guide-way and into the brake beam chamber.

The inner end of the brake beam extension beyond the locking key receiving apertures and at its forwardly presented edge is somewhat transversely reduced, forward of the rearward edge of the extension as shown at 32, to provide a transversely disposed socket on the upper and lower faces of the extension to receive resilient means or balance spring 33. In the specific exemplification disclosed in Figures 3 and 4, the spring 33 is shown in the form of a comparatively wide resilient metal strip bent into somewhat ogee form so that the intermediate cavity portion 33ᵃ may receive and effect gripping relation with the body of the extension while the flared ends 33ᵇ engage the opposite walls of the channel or chamber 22 in the enlarged end of the brake beam. The purpose of the balance spring is to maintain the extension in its retracted or extended position and to return the beam to the proper angularity when in brake release position.

The somewhat key-hole contour of the channel 22 in the brake beam is more clearly shown in Figure 1, where the more or less snug relation between the enlarged arcuate forward edge of the extension also is disclosed. As is apparent from Figure 1, more or less play or clearance between the reduced rearward edge of the extension and the sides of the channel in the beam is provided which permits slight relative rotative movement or angling between the brake beam and the extensions to compensate for the tangential loads produced by the frictional engagement between the brake shoes and wheels during brake application. Without our improvement, the tangential loads encountered during brake application would induce rotary movement of the beam, restricted by the side frame guides, and result in torsional stresses at the brake beam ends and a resultant binding condition in the guides with a consequent loss of braking power. These conditions are eliminated with our improved construction. The main body of the brake beam terminates in enlarged hollow sections at the junction of the brake head and truss adjacent the side frames where the enlarged hollow end sections of the beam may contact the guide-way forming ribs during lateral side frame movement and thus avoid loads or strains being placed on the extension retainer.

During installation, the extensions 25 are retracted or forced into the brake beam hollow end sections, being frictionally maintained in position by the balance springs. After proper positioning of the beam a proper tool or rod is inserted through the opening 24 in the web of the beam and the flat surfaced ends of the extensions forced into the respective guide-ways on the inner side of the side frame as shown in Figure 2 and the extension locked in its extended position by insertion of the retainer pin or member 31 through the aligned apertures in the brake beam hollow end sections and the extensions. In order to remove the brake beam, the retainer pin or member is first removed and a suitable tool or rod is inserted through the side frame hole 15ᵃ and the retainers forced longitudinally into the hollow or socketed end sections of the brake beam.

In Figures 5, 6, and 7 we show a modification of the invention, with the wheel side of the portion of the side frame 15 provided with parallely arranged ribs to form the brake beam guide-way 16, as in the previous figures.

The brake beam, similar to the previously described construction, at the ends, terminates in the enlarged hollow or chambered sections 34 (only one being shown) with which the brake head 18 preferably is formed integral.

The chamber in the brake beam end section 34 also is of the somewhat key-hole formation in cross section and extends longitudinally to receive the elongated combined wear and spring member or sleeve 35 shown in perspective in Figure 7. The sleeve member 35, preferably, is immovably secured in the chambered beam section 34, namely by welding the outer end of the member 35, as indicated at 36 in Figure 5 and adjacent its inner end by a plug weld 37 introduced through an opening drilled or formed in the brake beam section 34, see Figure 5. The wear member 35 is in the nature of a split substantially cylindrical resilient sleeve adapted to snugly fit into the enlarged or substantially annular portion of the chamber. The split sleeve, adjacent its inner end, is provided with the laterally disposed and somewhat outwardly flaring resilient lobes 35ᵃ, 35ᵃ, see Figure 7.

The sleeve lined chamber then receives the beam extension member 38 which is substantially similar to the extension member 25 of Figure 4, provided with the flat top and bottom surfaces at its outer end to fit into the guide-way formed on the inner surface of the side frame and with the enlarged arcuate marginal portion inwardly of the flat surfaces as shown in Figure 6 and extending to the inner end of the extension; while the opposite longitudinal edge 38ª of the extension is somewhat reduced and provided with flat surfaces as shown in Figure 6. This reduced and flat sided portion 38ª of the beam extension is adapted to pass between and press apart the spring lobes 35ª which therefore exert lateral pressure against the extension 38. The reduced edge or portion 38ª is of somewhat smaller transverse dimensions than the transverse dimension of the narrower portion of the chamber in the beam section so as to permit a predetermined degree of rotative movement between the main portion of the brake beam and the beam extensions similar to that permitted in the construction shown in Figures 1 to 4 heretofore described.

As the split sleeve or wear member 35 is rigidly secured to the walls of the brake beam section 34 against movement, it is apparent that the spring portions or lobes 35ª, 35ª will exert a yielding pressure against the reduced edge of the beam extension. That is to say, the spring lobes of the sleeve member will absorb or compensate for the rotary or torsional stresses encountered by the brake beam during brake application and cause the beam proper and its extensions to return to and be maintained in normal position when the brakes are released.

The brake beam and the side frame are, of course, provided with suitable openings 24 and 15ª as previously described for the insertion of a proper tool or rod for forcing the extension members into and out of extended positions.

A similar retainer pin or member 31 (shown in the form of a U-shape key) may be employed for locking the extension members in extended position and hence the beam end sections are provided, at opposite sides, with the holes 30. The split sleeve 35 on its arcuate or closed side is provided with a slot or cut-out 39 for passage of one leg or side of the U-shape key 31, while the other side or leg of the key is adapted to straddle or pass across the split side of the sleeve as shown in Figure 5. The keys in both instances may be held against accidental removal by slightly bending the exposed lower ends of the key-legs or sides as shown in Figures 1 and 6.

In view of the lack of clearance between the respective elements of railroad car trucks at present in use and wherein rigidly constructed brake beams are slidably supported in inclined guideways formed on the truck side frames, the guideways do not permit application or removal of the rigidly constructed beams to an assembled truck, namely after the truck side frames have been put into place. That is to say, in order to make application and permit removal of the rigid beam it is necessary to remove the truck from the car and dismantle the side frames for application and replacement of the beam; an operation involving considerable loss of time and labor expenditure.

With our improved construction this loss of time and expenditure are materially reduced because installation and removal of the brake beam may be made without removing or dismantling the truck.

The exemplifications shown and described are believed to be the simplest embodiments of the invention, but structural modifications are possible and may be made without, however, departing from the spirit of our invention as defined in the appended claims.

What we claim is:

1. In a brake beam assembly for railroad cars involving a truck side frame provided on its inner side with a brake beam guide-way; a brake beam provided with a longitudinally chambered end section terminating adjacent the side frame guide-way; a brake beam extension member movably mounted in the chamber of said brake beam end section and having an end adapted to engage and be supported by said side frame guide-way; resilient means arranged on said extension member and adapted to frictionally engage the side walls of said chamber to maintain proper angularity of the brake beam when in brake released position; and means whereby said extension member is locked in its extended position.

2. A brake beam assembly for railroad cars comprising, in combination with truck side frames each provided on its inner side with an inclined guide-way; a brake beam provided at its ends with longitudinally chambered sections; brake beam extension members movably mounted in said chambered sections and their outer ends adapted to extend into said guide-ways when said extension members are in extended position, the transverse configurations of the chambers and of the body portions of said extension members being such that a predetermined degree of rotative movement between the brake beam and the extensions is permitted during brake applying operations; and resilient means whereby the normal relation between the beam and said extensions is restored when the brakes are released.

3. A brake beam assembly comprising, in combination with truck side frames provided with guide-ways on their inner sides; a brake beam having end sections provided with longitudinally extending chambers; brake beam extension members movably mounted in said chambers, said chambers being of length to wholly receive the extension members when the latter are in retracted position, the chambers and extension members being formed to permit a predetermined amount of relative rotative movement; means arranged in said chambers whereby the beam and extension members are restored to normal position; and means whereby the extension members are locked in extended position.

4. In a brake beam assembly, a brake beam provided with longitudinally chambered end sections; extension members longitudinally movable in said chambered end sections, the cross-sectional configurations of the chambers and the extension members being such that a predetermined degree of relative rotative movement between the brake beam and the extension members may be obtained; and means for locking the extension members in extended position.

5. In a brake beam assembly, a brake beam provided with end sections having longitudinally extending chambers; extension members longitudinally movable in said chambers, the cross-sectional configurations of the chambers and of the extensions being such that a predetermined degree of relative rotative movement between the brake beam and the extension members may be obtained; spring means operatively intermediate the walls of the chambers and the extension members for yieldingly resisting the rotative movement and for returning the beam and the extensions to normal condition upon release of the brakes.

6. In a brake beam assembly, a brake beam provided with end sections having longitudinally extending chambers; extension members longitudinally movable in said chambers and adapted to be wholly received in said chambers, the transverse configurations of the chambers and said extension members being such that a predetermined degree of relative rotative movement between the brake beam and the extension members may be obtained; means arranged in said chambers against longitudinal movement and having pressure exerting relation with opposite sides of the extension members for yielding resisting rotative movement between the beam and the extension members and for returning the beam and extension members to normal position upon brake release; and means whereby the extension members are locked in extended position.

7. In a brake beam assembly, a brake beam provided with end sections having longitudinal chambers; extension members movably mounted in said chambers, the transverse configurations of the chambers and the inner ends of the extension members being such that a predetermined degree of relative rotative movement between the brake beam and the extension members may be obtained; wear receiving means immovably secured to the walls of said chambers and provided with resilient portions arranged in pressure exerting relation with opposite sides of the extension members for yielding resisting rotative movement between the beam and said extension members and for returning the beam and extension members to normal position; and means, operable from the beam end section exteriors, for locking the extension members in extended position.

8. In a brake beam assembly, a brake beam provided with longitudinally extending chambers in the ends; extension members longitudinally movable in said chambers and wholly seatable therein, the transverse configurations of the chambers and inner ends of the extension members being formed to permit a predetermined degree of relative rotative movement between the brake beam and the extension members; a wear receiving sleeve immovably secured to the walls of each chamber and provided with resilient portions adapted to engage opposite sides of the extension member and resist relative rotative movement between brake beam and the extension members and to restore the normal positions of the beam; and means for locking the extension members in extended position.

9. A brake beam assembly for railroad car trucks comprising, in combination with the truck side frames, each provided on its inner side with a guide way and a tool receiving opening aligned with the guideways; a brake beam provided with longitudinally chambered end sections having transversely disposed locking pin receiving openings and tool receiving openings at the inner ends of the chambers; a brake beam extension member movably mounted in each chamber while its outer end is adapted to slide lengthwisely of the guide-way, the inner ends of the chambers and of the extension members being formed to permit a predetermined amount of relative rotative movement between the extension members and the brake beam; resilient means in the chambers and operatively associated with the extension members for absorbing the rotative movement and for returning the beam and extension members to normal position; and a locking key or pin adapted for insertion in said pin receiving openings whereby the extension members are locked in their extended position.

10. In a brake beam assembly for a railroad car truck, a brake beam terminating adjacent the truck side frame; end extension members arranged in telescopic relation with the brake beam so as to shift longitudinally into extended or retracted position, the telescopic relation between the beam and extension members being such that a predetermined degree of relative rotary movement is permitted when the extension members are in extended position; means for yieldingly resisting the rotative movement and for restoring the beam to normal position; and means whereby said members may be locked in extended position.

11. In a brake beam assembly, car truck side frames provided on their inner sides with guideways and openings at the ends of the guide-ways; a brake beam terminating short of the side frames in longitudinally chambered end sections; extension members lengthwisely slidable in the beam chambers provided at their outer ends with wide guide-way engaging surfaces, while the inner ends of said members and the chambers are formed to permit a predetermined amount of rotative movement between the beam and the extension members when the latter are in extended position, the beam end sections and the extension members being provided with transverse openings adapted to register when the extension members are in extended position; resilient means arranged within the chambers at the inner ends of the extension members for resisting the rotative movement and for restoring the beam and the extension members to normal position; and a locking pin insertible through the registered openings for locking the extension members in extended position.

12. In a brake beam assembly, a brake beam provided with longitudinally chambered end sections; extension members longitudinally movable in said chambered end sections; resilient means associated with said extension members adapted to permit rotative movement of the beam; and means for locking the extension members in extended position.

MALCOLM S. JOHNSON.
GILBERT F. OAKLEY.

No references cited.